June 21, 1949.  C. E. JOHNSON  2,473,752

SELF-LOCKING TAPPET SCREW

Filed Aug. 19, 1946

INVENTOR
CHARLES E. JOHNSON
BY Liverance and Van Antwerp
ATTORNEYS

Patented June 21, 1949

2,473,752

UNITED STATES PATENT OFFICE 2,473,752

SELF-LOCKING TAPPET SCREW

Charles E. Johnson, North Muskegon, Mich., assignor to Johnson Products, Inc., Muskegon Heights, Mich., a corporation of Michigan Application August 19, 1946, Serial No. 691,546

1 Claim. (Cl. 151—14)

This invention relates to novel improvements in self locking tappet screws which, in practice, are threaded into an end of a tappet body and may be adjusted or changed in position to vary the over-all length of the tappet.

It is a primary object and purpose of the present invention to provide a novel tappet screw which, when threaded into an interiorly threaded opening to receive it made in an end of a tappet body, such interior threads of the opening in the body being of standard type, the screw, before approaching its properly adjusted position, strongly resists turning movement with respect to the body and is frictionally held against any change of position or departure from a position to which it may be adjusted without the use of lock nuts or other previously used holding means. More specifically, my invention is directed to a novel tappet screw construction in which the cost of production is reduced to a minimum and fabricating operations are less in number than heretofore, so that the manufacturing cost is reduced and the tappet screw of my invention manufactured at a minimum cost of production. At the same time the tappet screw is particularly satisfactory in service for the functions which it is to fulfill.

An understanding of the invention may be had from the following description, taken in connection with the accompanying drawing, in which, Fig. 1 is a partial vertical section and side elevation showing an engine installed tappet having the adjustable tappet screw of my invention used therewith.

Like reference characters refer to like parts in the different figures of the drawing.

Figure 1:
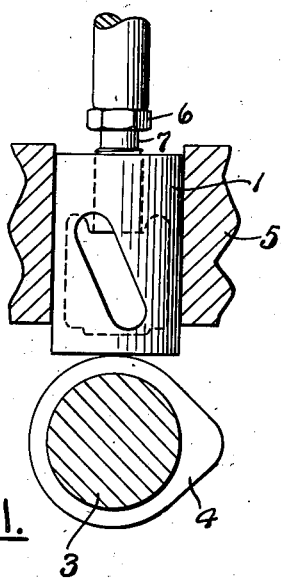
Figure 2:
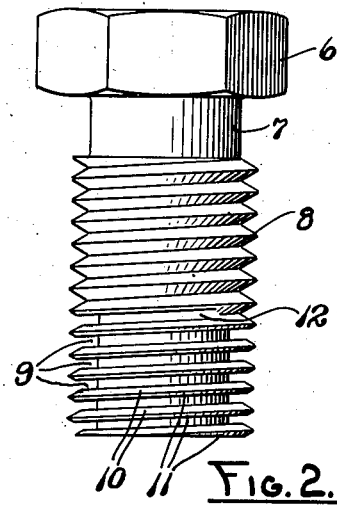
Fig. 2 is an enlarged elevation of the tappet screw of my invention after the threading manufacturing step thereof has been accomplished.
Figure 3:
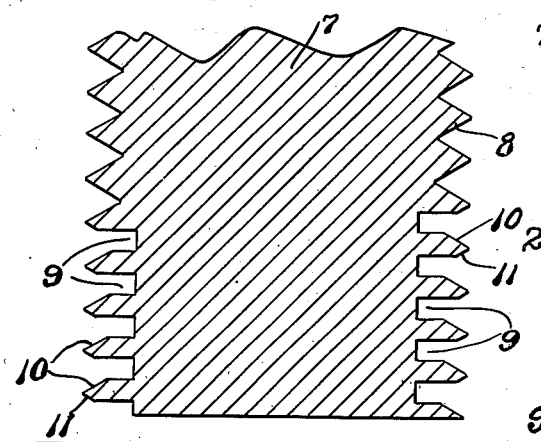
Fig. 3 is a greatly enlarged fragmentary longitudinal section of the inner end of the tappet screw structure at the completion of the threading operation.

The tappet body 1, shown as of barrel type cylindrical in form, at its upper end portion is interiorly bored and threaded in accordance with a standard specification with interior threads 2. The tappet body having a closed lower end in many engines is located with a closed end over a rotating cam shaft 3, a cam 4 on the shaft riding against the lower end of the tappet body 1, serving to move it upwardly to lift a valve, the body following the contour of the cam by being strongly pressed thereagainst by the valve closing spring with which each engine valve is supplied in the usual and well known manner. The tappet body is guided in its movements in cylindrical guide openings, therefor, in the engine block or a member permanently secured to the engine block and in effect integral therewith, shown at 5.

The tappet screw of my invention has a head 6 of a conventional form to receive a wrench from which, at one side, a shank 7 of cylindrical form extends. The shank of the screw is exteriorly threaded as at 8 with threads of the proper specification to cooperate with the interior threads 2 of the body 1.

A plurality of the threads at the free end of the shank are changed in form from the usual V-thread by cutting a continuous groove at the bottom of the threads into the body of the shank 7 of a so-called substantially square form as indicated at 9. Such groove 9 is of a continuous helical character in accordance with the like character of the bottoms of the threads cut and, preferably, the groove is offset to one side so that in the disclosure made, the upper inclined sides 10 of the threads at the free end of the threaded shank are of a greater area than the lower sides 11. Such deepened grooves at 9 of the shape and outline shown and described extend toward the headed end of the screw as far as necessary in practice, generally to an extent of approximately five threads (which may be varied), the groove running out and terminating as indicated at 12, between the upper lower ends of the threaded section of the screw.

Figure 5:
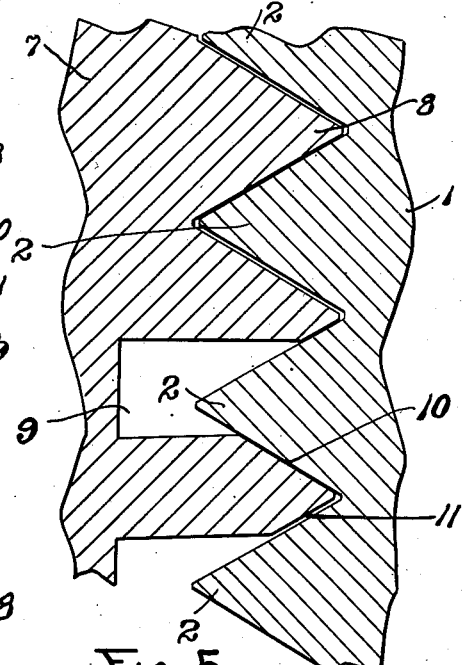
Fig. 5 is a still further enlarged vertical or longitudinal section of adjacent engaging portions of the threads of the tappet screw with those of the interiorly threaded body.
Figure 4:
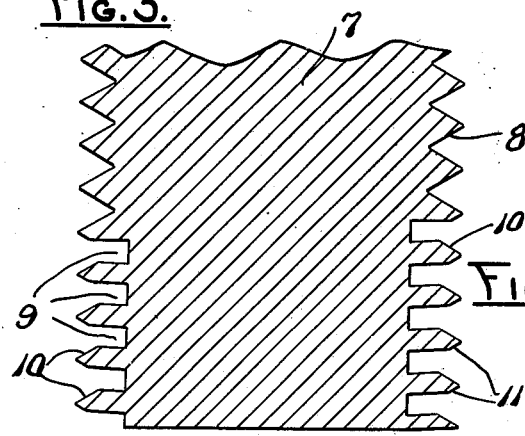
Fig. 4 is a similar view showing the lower threads of the screws displaced or offset axially from the positions which they occupy at the completion of the threading operation as shown in Fig. 3.

With the tappet screw illustrated in the drawing the lower threads are offset after the threads have been cut in an upward direction, as shown in Figs. 4 and 5, thus the projecting threads at the lower end of the tappet screw are disposed at a slight angle to the horizontal. The thread immediately above the upper end portion of the groove 9 and the one immediately below, approach each other by a few thousandths of an inch closer the remaining adjacent threads of the screw. It is to be understood, of course, that the tappet screw shown is of the type of which the greatest number is used in internal combustion engine. In overhead valve internal combustion engines, the screws will be reversed in position and a reversal of the offsetting of the grooves at 9 will likewise follow. As shown in Fig. 5, the under sides of the threads 8 will be drawn very snugly against the upper sides of the threads 2 and the upper sides of the lower threads snugly against the under sides of the threads 2, thereby obtaining the greatest supporting area between the threads 8 and 2 for the pressure or load which is to be sustained. And at the same time, the wider surface areas at 10 at the upper sides of the lower threads will provide greater areas than if the grooves 9 were symmetrically located between succeeding spaced outwardly extending portions of the threads.

When the tappet screw is inserted in the end of a tappet body it turns freely and easily until the lower threads with the helical groove 9 between have been received wholly within the body. With a continued threading of the tappet screw into the body the axial offset of the lower threads results in the lower threads, separated by the helical groove 9, being sprung back to or toward their initial positions which they had before the permanent offsetting or axial change of position occurred. Such bending or straining back is resisted by the lower threads, resulting in a very strong frictional engagement of the lower sides of the upper screw threads 8 with the upper sides of the threads 2 (Fig. 5) and of the upper sides 10 of the lower threads of the screw with the lower sides of the threads 2. This provides an effective holding of the tappet screw with respect to the tappet body such that under all normal circumstances of operation, the tappet screw is in effect locked in any position to which it has been adjusted; and can be changed from such position only by the exertion of a considerable force, the tappet body being held against movement and the screw turned by a wrench applied to the head 6.

The novel construction described is very practical, useful and effective. The entire threading operation may be performed in one continuous step on an automatic screw machine, the threading dies for cutting the threads being constructed to cut both the upper unchanged threads 8 and the lower threads having the deepened, square helical groove 9 between them. The screw is completed by offsetting the lower threads in a single punch press or other equivalent operation. A minimum of handling and of operations is required resulting in the greatest economy in manufacture.

The invention is defined in the appended claim and is to be comprehensive of all forms of structure coming within its scope.

I claim:

A tappet screw having a threaded shank, the inner portion of which is threaded with standard threads, and the outer portion having a continuous helical groove extending inwardly into said shank between adjacent threads deepening the bottom of said threads, said last mentioned threads being offset axially with respect to the threads on the inner portion of said shank, said continuous helical groove between the threads at the outer portion of the shank being of a shape to provide outer threads having inner parallel sides and outer edge portions with inclined outwardly converging sides, said outwardly converging sides of each of said threads toward the inner threaded portion being of greater area than those at the other side thereof.

CHARLES E. JOHNSON.

REFERENCES CITED

The following references are of record in the file of this patent:

UNITED STATES PATENTS

| Number | Name | Date |
|---|---|---|
| 1,369,156 | Woodward | Feb. 22, 1921 |
| 1,807,494 | Proctor | May 26, 1931 |
| 2,269,476 | Poupitch | Jan. 13, 1942 |
| 2,347,910 | Johnson | May 2, 1944 |